United States Patent [19]

Gyimesi

[11] Patent Number: 4,671,742
[45] Date of Patent: Jun. 9, 1987

[54] WATER SUPPLY SYSTEM, ENERGY CONVERSION SYSTEM AND THEIR COMBINATION

[75] Inventor: Janos Gyimesi, Koroshegy, Hungary

[73] Assignee: Kozponti Valto-Es Hitelbank Rt. Innovacios Alap, Budapest, Hungary

[21] Appl. No.: 674,158

[22] PCT Filed: Mar. 9, 1984

[86] PCT No.: PCT/HU84/00015

§ 371 Date: Nov. 7, 1984

§ 102(e) Date: Nov. 7, 1984

[87] PCT Pub. No.: WO84/03541

PCT Pub. Date: Sep. 13, 1984

[30] Foreign Application Priority Data

Mar. 10, 1983 [HU] Hungary .................. 829/83

[51] Int. Cl.⁴ .................. F04B 17/04
[52] U.S. Cl. .................. 417/131; 417/138; 417/334
[58] Field of Search .......... 417/334, 335, 336, 130, 417/131, 138

[56] References Cited

U.S. PATENT DOCUMENTS

| | | | |
|---|---|---|---|
| 1,444,087 | 2/1923 | Rogers | 417/138 X |
| 2,139,954 | 12/1938 | Hartley . | |
| 3,367,281 | 2/1968 | Gray . | |
| 4,084,921 | 4/1978 | Norz | 416/17 |
| 4,174,926 | 11/1979 | Hamnick et al. | 417/334 |
| 4,249,598 | 2/1981 | Greer | 417/40 X |
| 4,380,419 | 4/1983 | Morton | 417/334 |

FOREIGN PATENT DOCUMENTS

| | | |
|---|---|---|
| 139268 | 2/1902 | Fed. Rep. of Germany . |
| 629361 | 5/1934 | Fed. Rep. of Germany . |
| 806442 | 12/1936 | France . |
| 954440 | 12/1949 | France . |
| 1050246 | 1/1954 | France . |

Primary Examiner—Carlton R. Croyle
Assistant Examiner—T. W. Olds
Attorney, Agent, or Firm—Young & Thompson

[57] ABSTRACT

Water supply system comprising a unit for converting the wind energy into kinetic energy, a unit for converting the kinetic energy into another usable form of energy and a unit for supplying water driven by that usable form of energy. According to the improvement, the unit for converting the wind energy is a wind motor (1) having rotor blades (41) and a control mechanism (42) for constant load on the rotor blades (41) independently from the wind intensity, the unit for converting the kinetic energy is a device for compressing the air to a pressure greater than that of the atmosphere and the unit for supplying water comprises a natural or artificial source of water such as a well (21) or a container operated by pressurized air and structure for temporary storage of the water and for controlling the water bailing from the source of water.

10 Claims, 11 Drawing Figures

WATER SUPPLY SYSTEM, ENERGY CONVERSION SYSTEM AND THEIR COMBINATION

TECHNICAL FIELD

Supplying water in areas where a communal water conduit system is not available is a major problem. Such areas are mostly far from the nearest inhabited land, thus, it is difficult to provide them with any kind of source of energy with which the conventional water supply systems could be operated.

PRIOR ART

Heretofore, a great number of different pumps for bailing water from natural or artificial water containers such as wells, ponds or water tanks or the like have been used. Besides piston pumps, membrane pumps and plunger or submerged pumps, pumps operated with pressurized air are nowadays utilized in water supply systems, especially where a relatively small water production is required. In the source of water, a production head is immersed through which the pressurized air is led into the water container and the greater pressure forces the water out of the source of water. The pressurized air is produced by conventional compressors driven by internal combustion engines or by electric motors. Unfortunately, the usefulness of these systems is limited—in addition to what has been said hereinabove—by the fact that the production and delivery of the pressurized air is controlled on a time basis and, therefore, only compressors and driving means with stationary characteristics can be used.

Where other sources of energy are not available, natural energy in form of e.g. natural wind energy is abundantly available, throughout the world. As is well known, there are several reasons for the lack of utilizing the natural energies. However, it has already been proposed to use wind motors for generating electric power or to bail water from wells. In the latter case, the rotational motion of the rotor blades of the wind motor is converted into an alternating motion of a vertical shaft to which a piston or a membrane immersed in the water to be lifted are attached. This is shown in the book of Frank R. Eldridge: "Wind Machines" (Van Rostrand Reinhold Company, New York, 1980, P. 22 and 77).

A great difficulty when using wind motors has always been how to protect the wind motor, its carrier mechanism and the devices attached to it against the damage of stormy weather and great wind intensity. Furthermore, the wind motor should rotate as constantly as possible independently from the always changing wind intensity. Until now, this problem was not solved. In the above said book (P. 36), arrangements for turning the wind motor out of the wind when the wind intensity is too great are proposed. In this safety position, the wind motor is stopped.

SUMMARY OF THE INVENTION

The main object of the invention is, in view of the above, to provide a water supply system which is not bound to "artificial" sources of energy such as any petroleum product or electricity and with which a stable water production is possible. For this, a unit for converting the natural wind energy into another usable form of energy should be constructed, which is easy to manufacture and reliable in function independently from the wind intensity. Furthermore, an apparatus for supplying water should be provided, too, with which the inconveniences of the known systems are at least partially eliminated and which is operated by pressurized air and is not sensitive to the change in the pressure and amount of the pressurized air.

Part of the main object to be achieved with this invention is, finally, to combine an energy conversion means such as wind motor, an air pressurizing means such as a compressor and a water supplying arrangement for producing water in a simple, reliable and unexpensive manner.

According to the invention, the water supply system comprises a unit for converting the wind energy into another usable form of energy and a unit for supplying water driven by said another usable form of energy. The improvement is that the unit for converting the wind energy is a wind motor having rotor blades and a control mechanism for constant load on the rotor blades independently from the wind intensity, the unit for converting the kinetic energy is a device for compressing the air to a pressure greater than that of the atmosphere and the unit for supplying water comprises a natural or artificial source of water such as a well or a container operated by pressurized air and means for temporary storage of the water and for controlling the water bailing from the source of water.

The known wind motors for converting the natural wind energy into rotational kinetic energy comprise wind motors for converting the natural wind energy into rotational kinetic energy comprising rotor blades each having a shaft mounted on a transmission shaft rotatable around its own axis as well as around a vertical axis and a guide blade turning the transmission shaft against the wind direction. According to the improvement of this invention, a control mechanism for constant load on the rotor blades independently from the wind intensity is provided comprising a sliding ring slidable on the transmission shaft parallel to its longitudinal axis, the sliding ring is thrust from one side by a resilient means and is connected to the other side of the shafts of the rotor blades for rotating them while the sliding ring slides on the transmission shaft, and fly weights connected to the slide ring for sliding it against the force of the resilient means.

Preferably the resilient means for thrusting the slide ring is a helical spring arranged around the transmission shaft with one end fixed against the transmission shaft.

According to an embodiment, each of the fly weights has a cranked control arm, the one end of which is pivotally joined to the transmission shaft and the bend point of which is pivotally joined to one end of a connecting arm, the other end of which is pivotally joined to the sliding ring, wherein the sliding ring is connected to the shaft of each rotor blade by a connecting rod ball-joined to the sliding ring, preferably to a flange portion of the sliding ring. Furthermore the rotor blades are rotatably joined to a carrier frame comprising an inner carrier ring and an outer carrier ring held together and coupled to the transmission shaft by radial spokes and the shafts of the rotor blades are pivoted to the carrier rings. The outer ring of the carrier mechanism may be fixed to the transmission shaft by stiffening spokes at an angle other than 90 degree.

It is preferable, too, that a tubular axle head is fixed on the transmission shaft, and the spokes, the one end of the helical spring and the control arm of the fly weight are attached to, and the sliding ring is arranged around, the axle head.

In another embodiment, the control arms of the fly weights are formed as angle levers coupled to the transmission shaft preferably by way of a fork, on the longer shanks of the angle lever the fly weights are fixed, and on each of the shorter shanks a roll is pivotally joined with and cooperates with the sliding ring, preferably with the flange portion of the sliding ring. In this case, the forks are fixed to bearing blocks holding each one rotor blade shaft and connected to the transmission shaft, preferably to the tubular axle head. The shafts of the rotor blades may be telescopic.

Preferably the connecting rod for turning the shaft of the rotor blades is attached by a detachable connection to the shaft of the rotor blades.

According to a further embodiment the transmission shaft is pivotally arranged in at least one bearing block, to which a vertical holding shaft is stiffly fixed, the holding shaft is pivotally arranged in at least one bearing block stiffly fixed to a carrier frame of the wind motor, and the guide blade is fixed on one bearing block of the transmission shaft.

In one combination of this invention, the apparatus for converting the natural wind energy into another usable form of energy comprise a wind motor having rotor blades with shafts attached to a transmission shaft rotatable around its own axis and around a vertical axis, a guide blade turning the transmission shaft with the rotor blades against the wind direction, and an energy conversion means. According to the improvement, the wind motor has a control mechanism for providing constant load on the rotor blades independently from the wind intensity comprising a sliding ring slidably arranged on the transmission shaft, the sliding ring is thrust from one side by a resilient means and is connected to the other side to the shafts of the rotor blades for rotating them while the sliding ring slides on the transmission shaft, and fly weights connected to the slide ring for sliding it against the force of the resilient means, and a compressor as said energy conversion means is provided for compressing air to a pressure greater than that of the atmosphere and the compressor connected to the transmission shaft of the wind motor.

In one embodiment, an outlet pipe for pressurized air is attached to the compressor and is connected to a forwarding pipe fixed to a carrier mechanism of the apparatus, and between the outlet pipe and the forwarding pipe means for rotatable and sealed connection is provided.

It may also be preferred that the means for rotatable and sealed connection has a housing with two halves secured together in a sealed manner to the one of which the outlet pipe of the compressor is connected and a hollow shaft emerging from the other half and sealed against it, the hollow shaft is freely rotatable in the housing and the forwarding pipe is connected to the hollow shaft.

The known apparatus for supplying water comprises, with a natural or artificial source of water such as a well or a container, a producing head arranged within the source of water and operated by compressed air. According to the improvement of this invention, to the producing head, means for temporary storage of the water, means for controlling the water bailed from the source of water and the water distributed from the storage means as well as a means for compressing the air to a pressure greater than that of the atmosphere, are attached.

For the purpose of driving the means for compressing air such as a compressor, the wind motor according to this invention may be used, In a preferred embodiment, the compressor is connected to the means for controlling the water bailing and distributing through an equalizing pressure tank, and the means for controlling the water bailing and distributing is a pneumatic-mechanical control mechanism connected to the producing head immersed in into the source of water and to the temporary water storage means.

Preferably the pneumatic-mechanical control mechanism has an air tank connected to the equalizing pressure tank and a working valve for connecting the producing head to the air tank or to the atmosphere, respectively; and an operating valve is arranged between the air tank and the working valve for operating the working valve depending on the pressure in the air tank. In this case, a membrane is arranged within the working valve as well within the operating valve separating their inner spaces into two compartments, in the first compartments of both valves, the membran plate is thrust by a resilient means such as a helical spring and the second compartment of the operating valve is connected through an air conduit to the air tank, the air conduit is opened or closed by the membran plate, and the second compartment of the operating valve is connected to the second compartment of the working valve, and the working valve has a valve shaft moving with the membran plate within a channel of the valve housing, the valve shaft has a through bore establishing connection between the air tank and the producing head or between the air tank and the atmosphere, respectively. The channel can have an enlarged hole to which a pipe connecting the working valve and the producing head is attached. The pre-stress of the resilient means may be adjustable.

It is also preferred, that a delay valve is provided, the inner space of which is connected to the second compartment of the working valve and is opened or closed down by a valve cup made of elastic material and attached to the valve shaft of the working valve by a resilient means such as a helical spring.

According to an embodiment, a change-over device is connected to the equalizing pressure tank for filling the closed water storage means such as a water tank partly with water, partly with pressurized air, and the automaton is controlled pneumatically.

In this case, the compressor for producing pressurized air is connected to the change-over device which, in turn, is connected to the upper portion of the water storage tank through two air conduits, into the first of which a non-return valve, into the second a pressure gauge are built, and the change-over device is connected to the pneumatic-mechanical control unit by an air conduit.

In another embodiment the water storage tank has a float chamber connected to the upper air space of the tank as well as to its lower water space, in the inside of the float chamber, a float having a tapered upper portion is arranged, the tapered upper portion co-operates with a tapered seat for closing or connecting the inside of the float chamber with the atmosphere even if there is overpressure in the float chamber.

It may be preferred, too, that the change-over automaton have a two-way change-over cock connected to the equalizing pressure tank by an air conduit, the cock connects the equalizing pressure tank to the pneumatic-mechanical control mechanism in its first position and to the water storage tank in its other position, and the change-over cock is operated by pressurized air in dependency on the air pressure within the water storage tank containing water and pressurized air coming from the source of water. The change-over may be operated by the change-over automaton through a lever mechanism, the other end of which is connected to a working valve cooperating with a resilient thrust means such as a helical spring thrust a membrane plate of the valve, on the other side of the membrane the pressure of the upper portion of the water collecting tank is forwarded.

In a further embodiment, the force of the resilient thrust means is transmitted to the membrane plate by a push rod having a perpendicular flange portion with which a turning lever of the lever mechanism cooperates, to the turning lever an arm is pivotally joined which cooperates with a snap disk moving a lever having a push arm pin-joined to it and the push arm is connected to the change-over cock for operating it between its two positions. In the push arm, a longitudinal slot may be formed and may cooperate with a nose fixed on the change-over cock.

Preferably the snap disk is formed as a cam disk, on the periphery of which a cam is provided cooperating with a roll turnable in a holding arm and forced against the periphery of the cam disk by a spring.

The turning lever may be rotatable around a pin and its end attached to the flange portion of the push rod is bifurcated.

According to an embodiment, the producing head arranged within the source of water has a closed chamber, on the bottom of which are opening with a valve body for closing it is provided, and a delivery pipe having a valve body for closing its lower end opening is arranged within the lower portion of the closed chamber. The valve bodies may be formed as weight-valve bodies.

In still another embodiment, a non-return valve is built into an air conduit connecting the compressor to the equalizing pressure tank and, optionally, a safety valve is provided between the non-return valve and the equalizing pressure tank.

Finally, it may be preferred, too, that non-return valves are built into an air conduit between the change-over device and the water storage tank as well as into an air conduit between the water storage tank and the producing head, respectively.

BRIEF DESCRIPTION OF THE DRAWINGS

Further objects and details of this invention will be more readily understood by way of examples and in connection with the accompanying drawings, in which.

PREFERRED EMBODIMENT OF THE INVENTION

Figure 1:
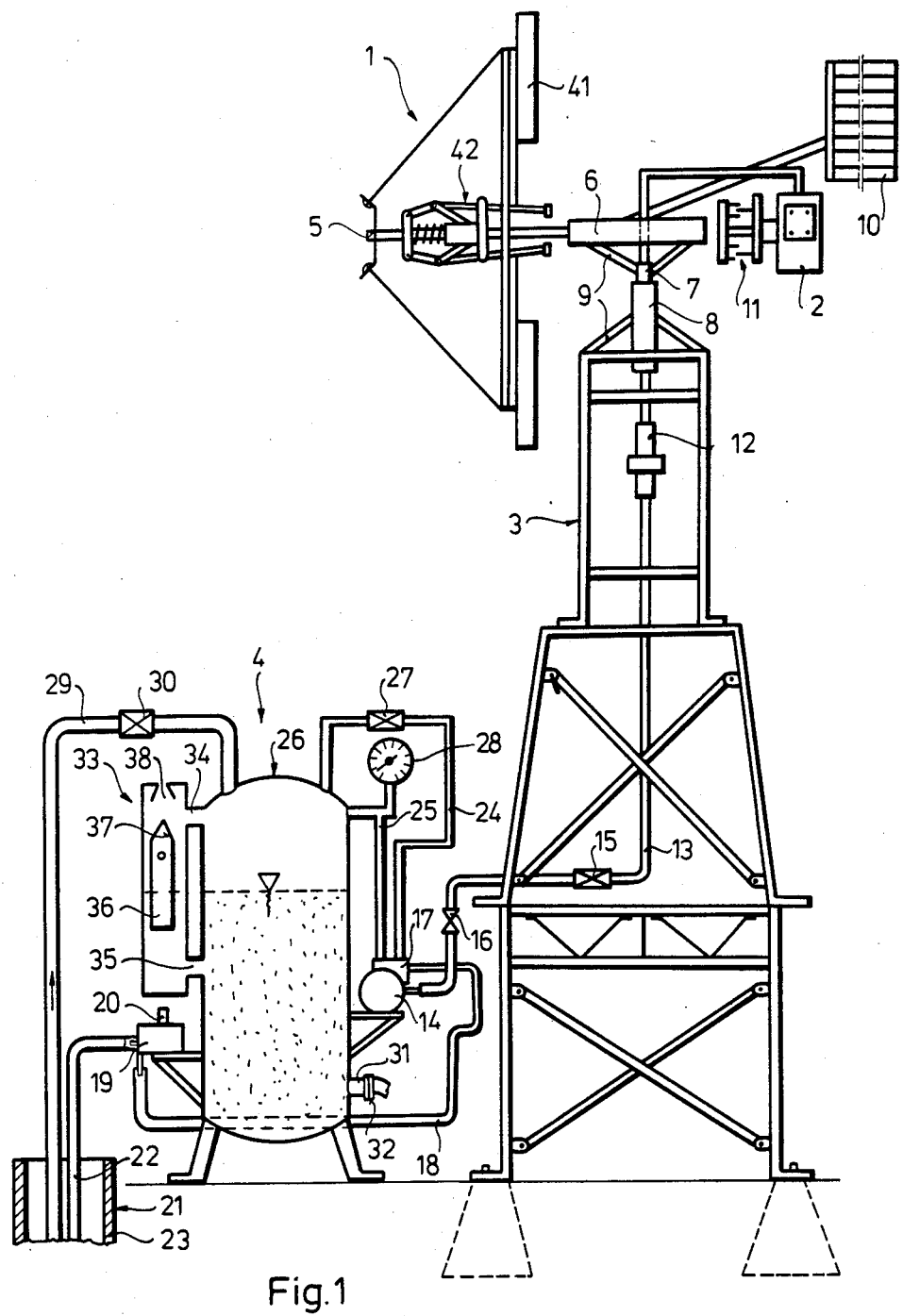
FIG. 1 a schematic illustration of an embodiment of the water supply system of this invention.

With reference now to FIG. 1, a water supply system has an energy conversion means such as a wind motor 1 and a compressor 2 attached to the wind motor 1, a carrier mechanism 3 for the energy conversion means and a water supplying arrangement 4.

The carrier mechanism 3 is, in this example, an iron framework, the height of which can be determined according to the local character of the terrain and the wind characteristics. On the top of the carrier mechanism 3, the wind motor 1 is arranged, a transmission shaft 5 of which is, in this example, horizontally arranged. The transmission shaft 5 is rotatably held by a bearing block 6 which is fixed to a holding shaft 7 rotatably attached to carrier mechanism 3 by a bearing block 8. With rods 9, bearing block 8 is stiffened against carrier mechanism 3.

To the transmission shaft 5, i.e. to the bearing box 6, a guide blade 10 is fixed for turning the wind motor 1 into the wind. To the transmission shaft, furthermore, compressor 2 is attached by way of a clutch 11.

The pressurized air is forwarded from compressor 2 to water supplying arrangement 4. Since compressor 2 is rotating around holding shaft 7 but arrangement 4 is staying still, a swivel coupling 12 part is necessary in air conduit 13. This device 12 will be disclosed in greater detail in connection with FIG. 11.

Air conduit 13 is led into an equalizing pressure tank 14 and contains a non-return valve 15 and a safety valve 16. To tank 14, a change-over device 17 is attached, which, in turn, is connected through an air conduit 18 to a pneumatic-mechanical control unit 19 having a blow-off outlet 20. The control unit 19 is connected with a well 21, more precisely with an air conduit 22 arranged within a casing pipe 23 of the well 21.

From change-over device 17, two more air conduits 24 and 25 are led out both of them terminating in a water storage tank 26, in its upper portion containing air. In the first air conduit 24, a non-return valve 27 and in the other air conduit 25, a pressure gauge 28 is provided. Into the upper portion of water tank 26 is also led a water pip 29 delivering water from well 23 and having a non-return valve 30. The lower portion of water tank 26 contains water delivered from the well 23 whence the water is distributed through a pipe 31 having a cock 32.

The the water tank 26, a float chamber 33 is attached, namely with an upper air conduit 34 to the air space of tank 26 and with a lower water pipe 35 to the water space of tank 26. In float chamber 33, a float 36 having a tapered upper portion 37 is arranged. The float chamber 33 has an upper opening 38 with a tapered seat cooperating with upper portion 37 of float 36 for closing or opening 38.

Figure 2:
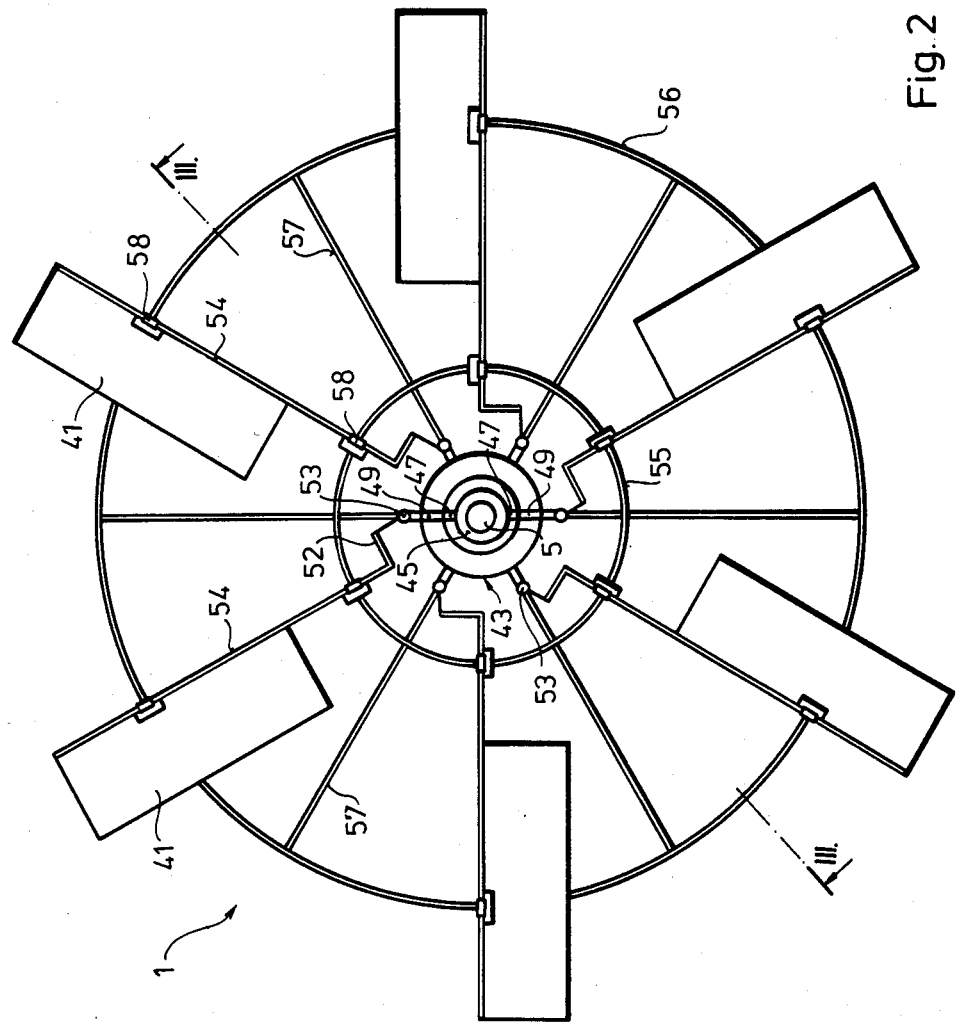
FIG. 2 shows a front view of the wind motor of the embodiment of FIG. 1
Figure 3:
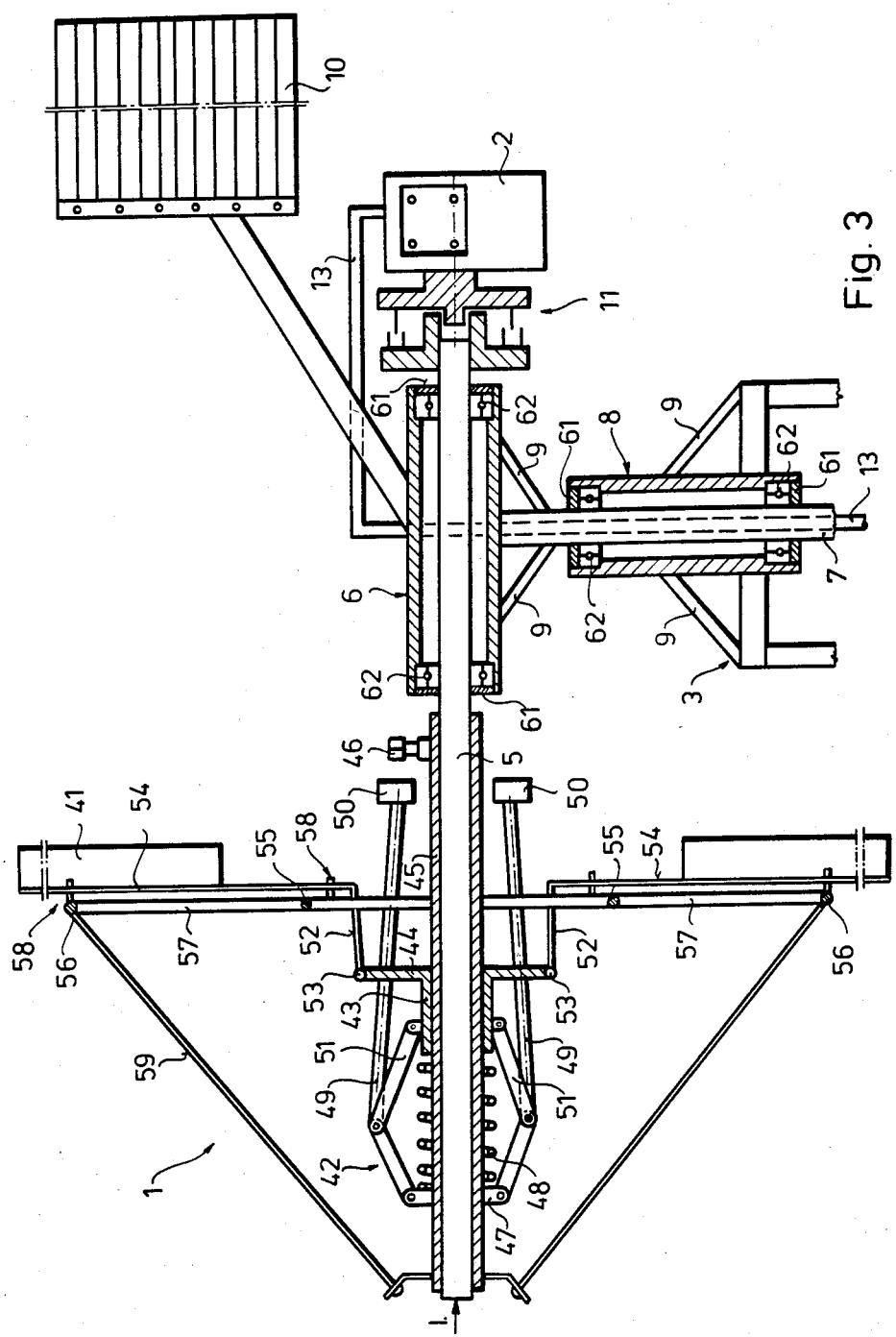
FIG. 3 is a cross-section according to line III—III in FIG. 2.

In FIGS. 1 and 2 wind motor 1 is shown in greater detail. To transmission shaft 5, rotor blades 41 are attached through a control mechanicm generally shown at 42. The control mechanism 42 has a sliding ring 43 with a perpendicular flange portion 44 slidably arranged in the transmission shaft 5, which is covered by a tubular axle head 45 detachably fixed to transmission shaft 5 by a screw 46. Thus, ring 43 slides on axle head 45 (FIG. 3). On the axle head 45, holding pieces 47 are fixed for holding a lever mechanism of the control mechanism 42 as well as resilient thrust means such as a helical spring 48 pressed, at the other end, against sliding ring 43.

As can clearly be seen in FIG. 3, cranked control arms 49 are pin-joined to holding pieces 47. On the other end of control arms 49, fly weights 50 are fixed. At the bend of control arms 49, a connecting arm 51 is pin-jointed, the other end of which is pivotally joined to the sliding ring 43. In this embodiment, there are two fly weights 50 and other parts attached to them arranged on diametrally opposite sides of transmission shaft 5.

On flange portion 44 of sliding ring 43, in this embodiment on the edge of flange portion 44, connecting rods 52 are ball-jointed at 53. Here, five connecting rods 52 are provided, the other ends of which are stiffly fixed to shafts 54 of rotor blades 41. The rotor blades 41 have their own carrier frame comprising an inner carrier ring 55 and an outer carrier ring 56 which are held together and coupled to the transmission shaft 5, i.e. to axle head 45 by radial spokes 57. The shafts 54 of rotor blades 41 are pivotally attached to the carrier frame at the joints of every second radial spoke 57, inner carrier ring 55 and outer carrier ring 56, as is shown at 58. In this way, every shaft 54 is pivoted two bearings 58 (FIG. 2). The outer carrier ring 56 also fixed to axle head 45 by stiffening spokes 59 by with which a more rigid structure for the carrier frame is provided. Furthermore, the wheel-like carrier frame can be balanced out or equilibrated with the help of stiffening spokes 59 in a very precise way, thus, the running of the carrier frame will be fairly smooth.

It is also apparent from FIG. 3 that bearing blocks 6 and 8 are closed at their both ends by sealing rings 61 and they have beneath sealing rings 61 ball bearings 62. With this arrangement, transmission shaft 5 with rotor blades 41 fixed to it can rotate ground its own axis as well as around the axis of holding shaft 7. By the latter rotation, the wind energy conversion means will always be turned against the wind direction.

As was already stated, compressor 2 for converting the rotational mechanical energy into another usable form of energy such as pressurized air is connected to transmission shaft 5 by clutch 11. The compressor 2 and clutch 11 as used in this invention are per se well known devices, thus a more detailed description is here not required.

Figure 4:
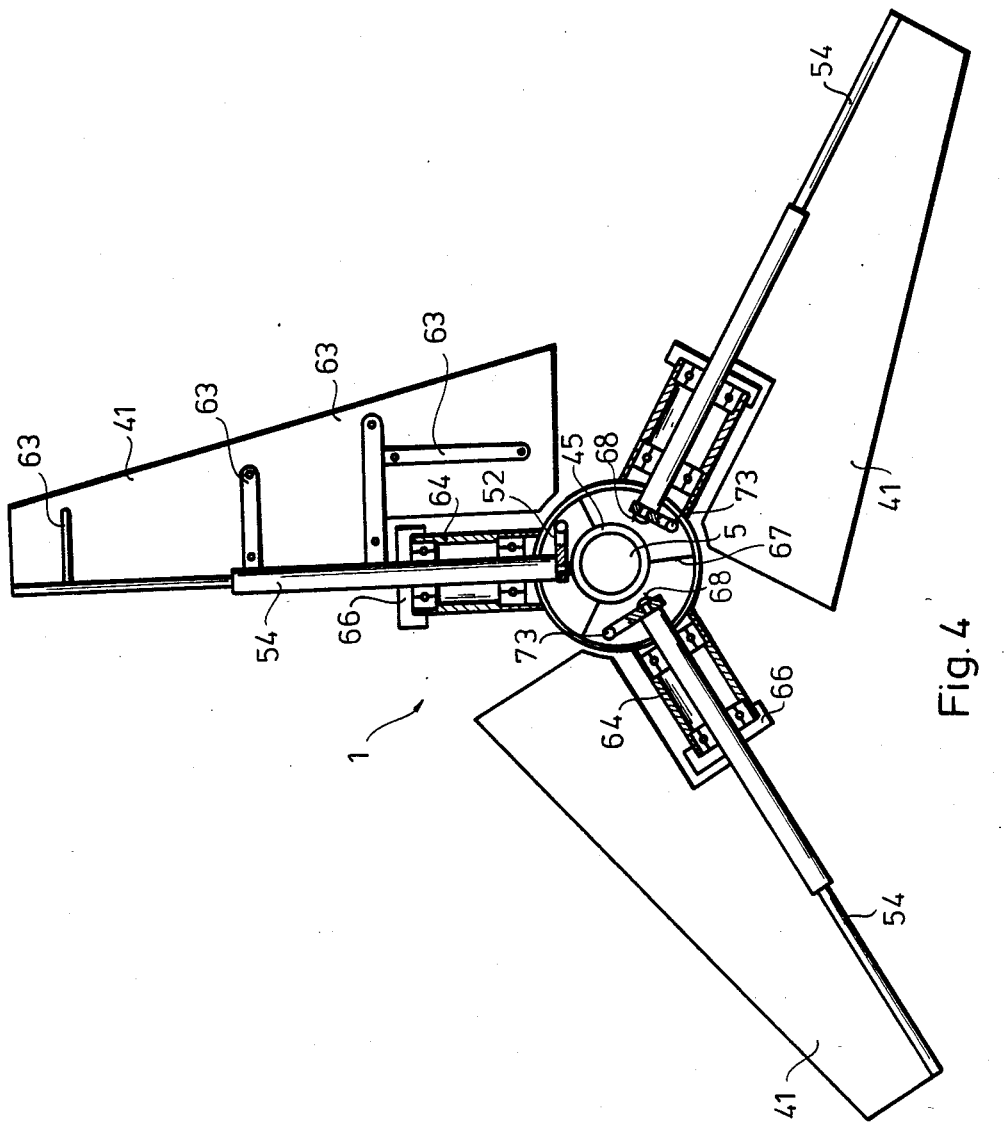
FIG. 4 shows a front view of another embodiment of the wind motor of this invention.

The wind motor 1 in its embodiment shown in FIG. 4 has only three rotor blades, the shaft 54 of which is telescopic. There is no carrier frame as in the previous embodiment. The blades 41 are trapezoidal and have stiffness 63. The shafts 54 are pivoted in bearing blocks 64 with ball bearings 65 closed by covers 66. Bearing blocks 64 are fixed to tubular axle head 45 which is stiffened by radial ribs 67 and is fixed on transmission shaft 5.

Figure 5:
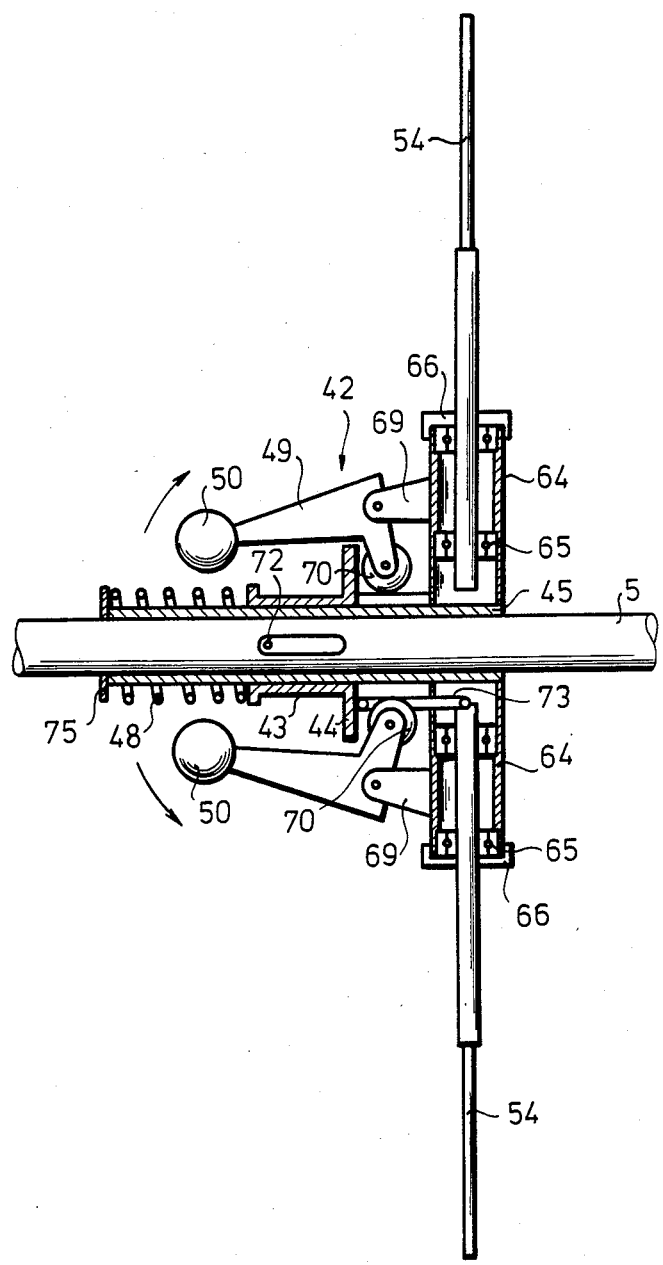
FIG. 5 is partly a cross-section, partly a side view of the embodiment of FIG. 4.

The control mechanism for the rotation speed of the wind motor 1 is also shown at 42 in this embodiment, as is apparent from FIG. 5. Sliding ring 43 with flange portion 44 can also be found. To shafts 54, connecting rods 52 are each fixed by a screw 68 (FIG. 4). The control arms 49 formed as angle levers are pivoted in a fork 69 fixed to bearing blocks 64. On the longer shanks of each control arm 49, the fly weight 50 is arranged and in the shorter shanks, a roller 70 is pivoted for cooperation with sliding ring 43, i.e. with flange portion 44. Sliding ring 43 is secured against rotation in respect to transmission shaft 5 or axle head 45 by a cooperating pin 72 and slot 71 and is thrust by a spring 48 which is pressed, at the other end, against an impact flange 75 of axle head 45. To flange portion 44 of the sliding ring 43, connecting arms 73 are ball-joined at 74, the other end of which is pivotally attached to connecting rods 52 for turning rotor blades 41 when ring 43 slides on axle head 45.

Figure 6:
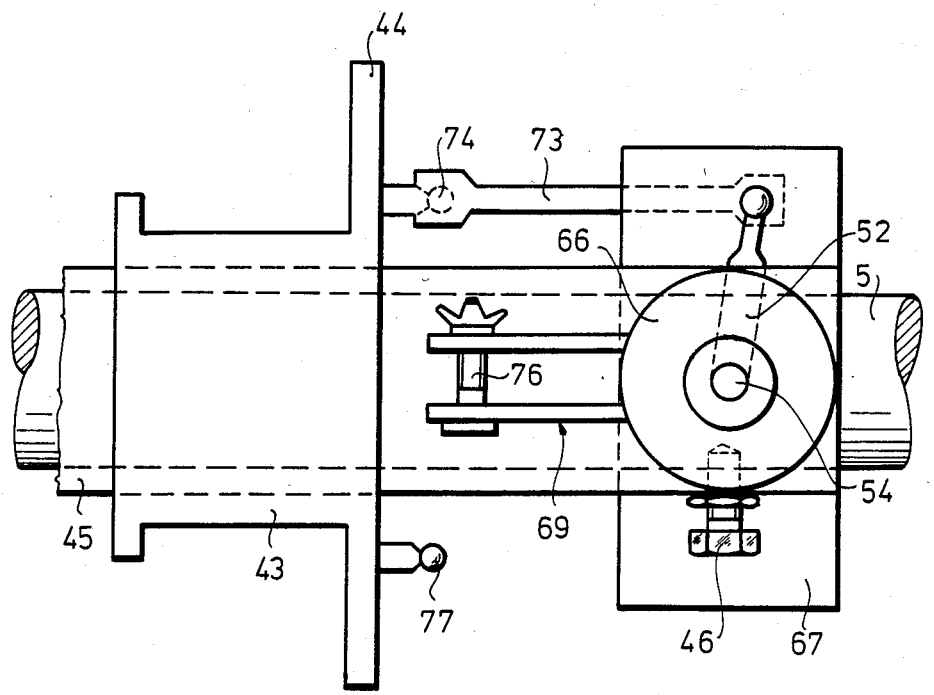
FIG. 6 is a schematic portion of the embodiment of FIG. 4 on a larger scale.

In FIG. 6, transmission shaft 5, axle head 45 on it, ring 43 with flange portion 44 sliding on axle head 45, as well as the connection between rotor blade shaft 54 and sliding ring 43 of the embodiment of FIGS. 4 and 5 are shown on a greater scale. Impact flange 75, spring 48 and control arms 49 are omitted for the purpose of clearer illustration. One can seen fork 69 with a bolt 76 for holding the control arm as well as screw 46 for fixing axle head 45 on transmission shaft 5, ball joint 74 with connecting arm 73, the latter of which is pivotally jointed to connecting rod 52 fixed to blade shaft 54. Ball joints 77 on flange portion 44 are left free and they will be used when a reversed rotation of rotor blades 41 is required.

The wind motor 1 as shown in FIGS. 2 and 3 functions as follows.

As the wind starts to blow, transmission shaft 5 with rotor blades 41 will be swung into the wind by guide blade 10 which tends to be parallel to the wind direction. Thus, all changes in the wind direction will be followed by the guide blade 10 and, hence, by rotor blades 41. The rotation of transmission shaft 5 is transmitted by clutch 11 to compressor 2, which, in turn, pressurizes air led away through air conduit 13.

When the speed is low, control mechanism 42 is in its initial position, the whole surface area of rotor blades 41 is impacted by the wind. Thus, this low wind intensity is enough to start the rotation of wind motor 1. But with increasing wind intensity, the centrifugal force exerted by fly weights 50 will force them out of their initial position to move away from each other. In this way, the ring 43 will slide on the transmission shaft 5 by the lever mechanism of control mechanism 42 against the force of helical spring 48 towards holding piece 47. But sliding ring 43 also moves connecting rod 52, which results in turning blade shaft 54 and, thus, rotor blade 41. In this way, the surface area of rotor blades 41 impacted by the wind will be smaller and, with this, the force borne on the blades 41 will be smaller, too. The transmission shaft 5 will rotate slower, more precisely, it will not rotate faster when the wind intensity gets greater. Since the centrifugal force borne in the fly weights 50 is always proportional to the rotational speed of the transmission shaft, the movement of sliding ring 43 will always be proportional to the wind intensity. If the wind gets slower, the spring 48 forces sliding ring 43 towards its initial position and, thus, the rotor blades 41 will be swung back.

The embodiment in FIGS. 4 to 6 functions on the same basis. The increasing centrifugal force results in moving the sliding ring 43 by the cooperation of rollers 70 and flange portion 43 towards impact flange 75 against the force of spring 48 and rotor blades 41 will be rotated through connecting arms 73, connecting rods 52 and blade shafts 54.

In this embodiment, the direction of rotation of the transmission shaft 5 can be changed in a quite simple manner. Connecting arms 73 are selectively connectible to ball joints 74 or 77 by loosening screws 68, placing connecting arms 73 on ball joints 74 or 77 and tightening screws 68.

Figure 7:
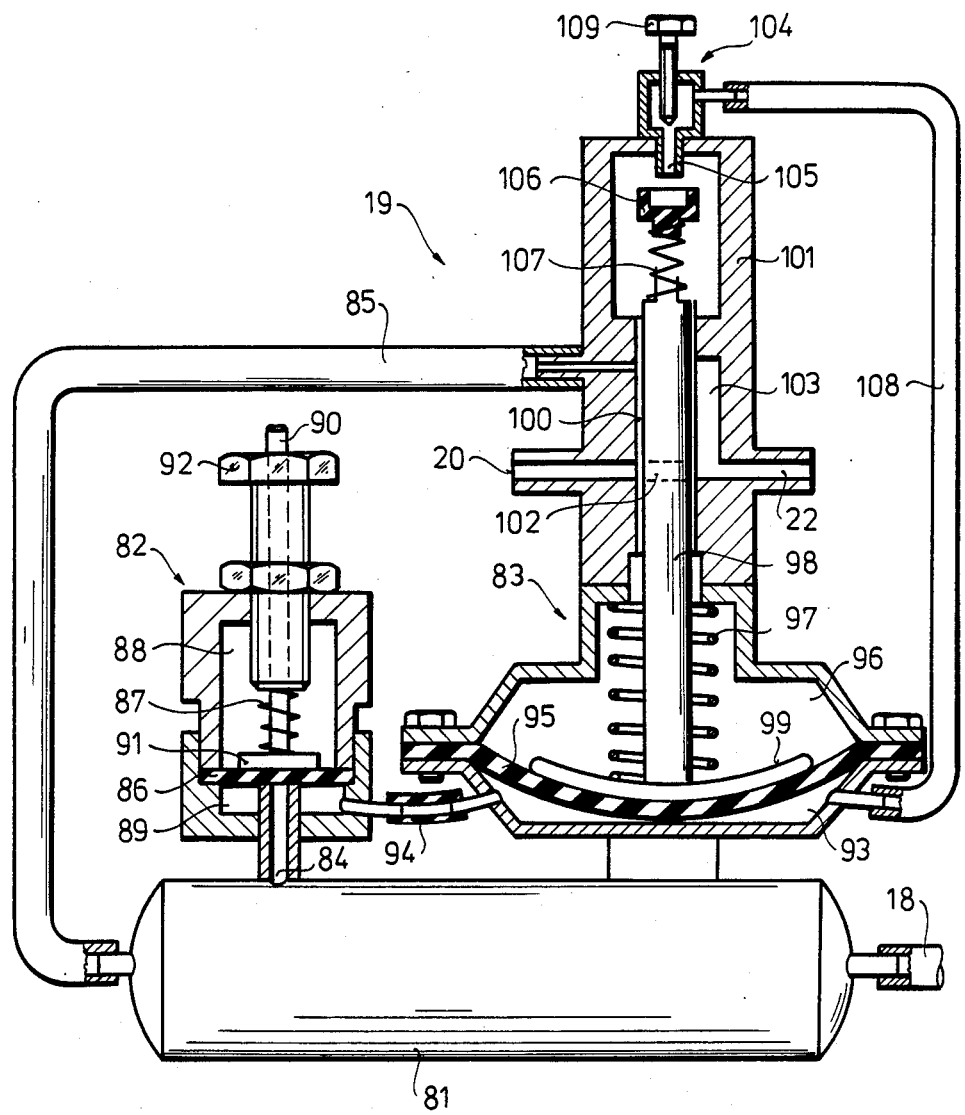
FIG. 7 is a detail, partly cross-section of the embodiment of FIG. 1: the pneumatic-mechanical control mechanism.

In FIG. 7, pneumatic-mechanical control unit 19 connected to the change-over device 17 through air conduit 18 as well as to the well 21 through air conduit 22 (FIG. 1) is shown in greater detail. Unit 19 has an air tank 81, an operating valve 82 and a working valve 83, and the valves 82 and 83 are connected to air tank 81 through air conduits 84 and 85, respectively. Air conduit 18 flows into tank 81.

Air conduit 84 terminating in the inside of operating valve 82 is closed by a membrane 86 made of elastic material and forced, in its initial position, against the opening of air conduit 84 by a spring 87. By this membrane 86, the inside of operating valve 82 is divided in an air-tight manner into an upper space 88 containing spring 87 and a lower space 89. Spring 87 is arranged around spring shaft 90 having a valve disk 91 fixed to its lower end and lying against membrane 86. With adjusting screw 92 provided in the upper portion of operating valve 82, the pre-stress of spring 87 can be adjusted.

Lower space 89 of operating valve 82 is connected to a lower space 93 of working valve 83 through air conduit 94, since the inside of working valve 83 is divided by a membrane 95 into two spaces, an upper space 96 and lower space 93. In the upper space 96, a spring 97 is arranged around a valve shaft 98 bearing against a valve disk 99 which, in turn, lies against membrane 95. The valve shaft 98 is guided in a channel 100 within a housing 101 of the valve 83.

From the housing 101, blow-off outlet 20 and air-conduit 22 (FIG. 1) are led out which are in alignment on both sides of housing 101. Valve shaft 98 has a through bore 102 which can be brought into alignment with blow-off outlet 20 and air conduit 22. Air conduit 85 flows into channel 100 and also blow-out outlet 20 starts from here. Channel 100 has an enlarged hole 103, whence air conduit 22 starts.

Above the working valve 83, a delay valve 104 is arranged, a pipe 105 of which penetrates into upper space 96 of working valve 83. Pipe 105 can be closed by a valve cup 106 made of elastic material and attached to the upper end of valve shaft 98 by a resilient means such as a spring 107. The inside of delay valve 104 is connected not only to upper space 96 but, through air conduit 108, also to lower space 93 of working valve 83, too. The cross-section of pipe 105 can be changed and, thus, the delay effect can be adjusted by a control screw 109 provided in the housing of delay valve 104.

Figure 8:
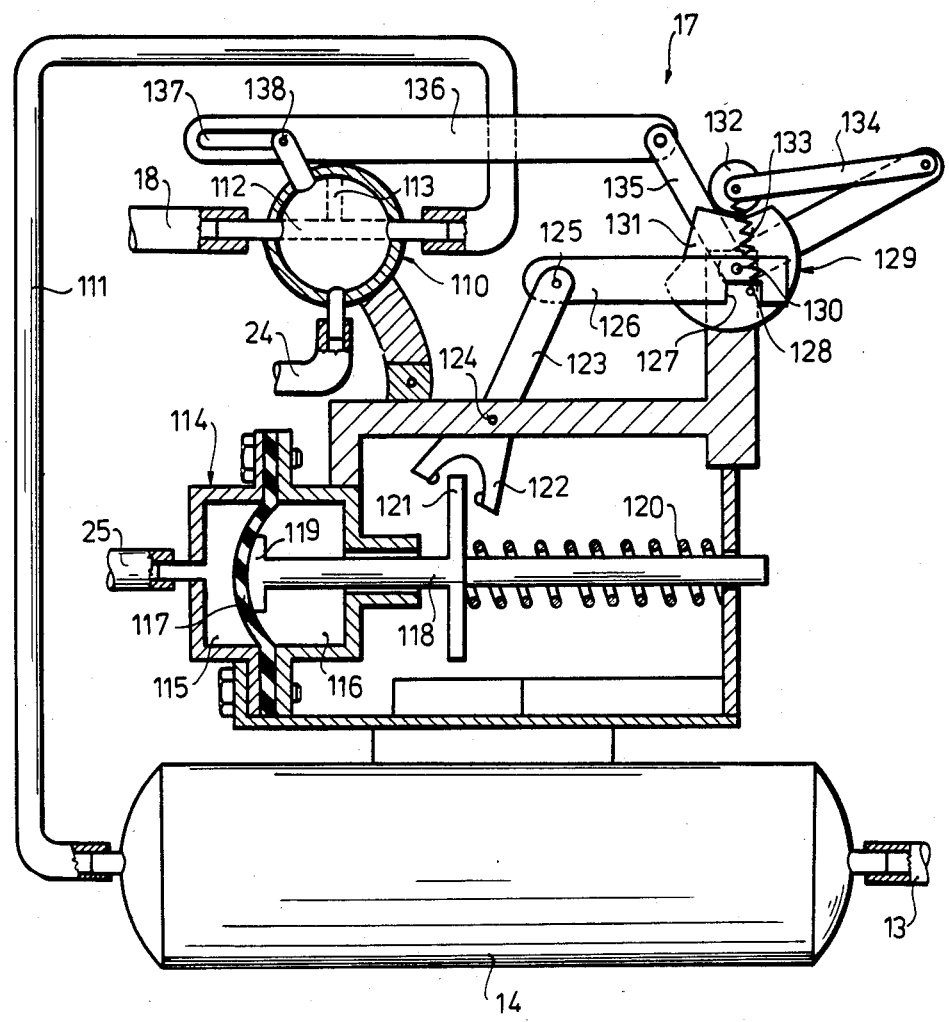
FIG. 8 is a detail as in FIG. 7: the change-over device, FIG. 9 another detail of the embodiment of FIG. 1: the producing head on a greater scale and in cross-section.

In FIG. 8, change-over device 17 with equalizing pressure tank 14 is shown in greater detail. Air conduit 13 coming from compressor 2 terminates in pressure tank 14 (FIG. 1). Change-over device 17 has a two-way change-over cock 110 connected by an air conduit 111 to the pressure tank 14. In the inner body of cock 110, a through channel 112 and a second channel 113 starting perpendicularly from the through channel 112 shown by dotted lines in FIG. 8 are provided. Furthermore, change-over cock 110 is connected through air conduit 18 to pneumatic-mechanical control unit 19 and through air conduit 24 to the air space of water storage tank 26 (FIG. 1).

The change-over cock 110 is operated in dependency on the pressure within water storage tank 26. For this, a working valve 114 is provided the inside of which is divided into two compartments 115 and 116 by a membrane 117. Into the first compartment 115, the pressure of water storage tank 26 (FIG. 1) is led through air conduit 25. In the second compartment 116, a push rod 118 with head portion 119 pressed against membrane 117 is slidably arranged. Push rod 118 is loaded in the direction of membrane 117 by a spring 120 which lies against a circular flange portion 121 of push rod 118. Furthermore, flange portion 121 cooperates with a bifurcated end 122 of a turning lever 123 pivoted at 124 and pivotally jointed at its other end 125 to an arm 126. The other end of arm 126 has a recess 127 cooperating with a pin 128 of a snap disk 129 pivoted at 130. The snap disk 129 is formed, at the same time, as a cam disk, on the periphery of which a cam 131 is provided, onto which a cam roller 132 is pressed by a spring 133. Cam roller 132 is pivotally held by a holding arm 134 which is pivoted to a lever 135. To the lever 135, a push arm 136 is pivotally attached, in the other end of which a longitudinal slot 137 is formed cooperating with a nose 138. The nose 138 is attached to the valve body of change-over cock 110.

Figure 9:
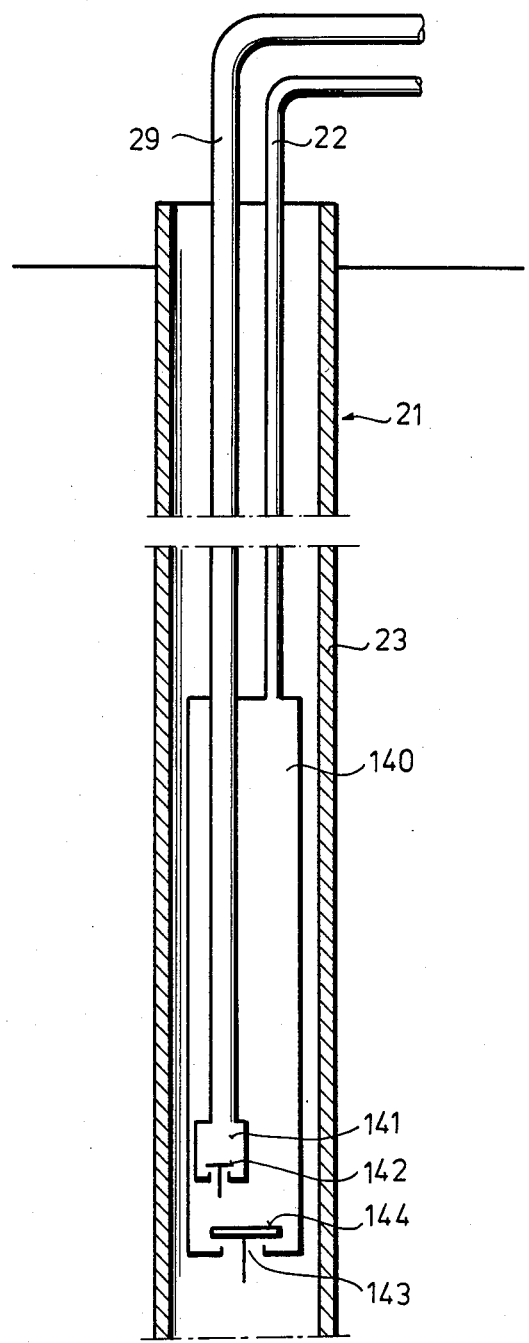

In FIG. 9, the producing head immersed in the source of water, e.g., in well 21 is shown. Within the casing pipe 23 of well 21, delivery pipe 29 attached to water storage tank 26 and air conduit 22 connected to pneumatic-mechanical control unit 19 are arranged (FIG. 1). To the lower end of air conduit 22 within well 21, a chamber 140 is attached, near the bottom of which, delivery pipe 29 has its inlet in the inside of the chamber 140. The entry is formed as a valve 141 with weighted valve body 142 which permits the inlet to open only if the pressure is greater outside the delivery pipe 29 than inside. The chamber 140 has also a bottom inlet formed as a valve 143 with a weighted valve body 144. In this casel, too, valve 143 will be opened only if the pressure is greater outside the chamber 140 than in its inside.

Figure 10:
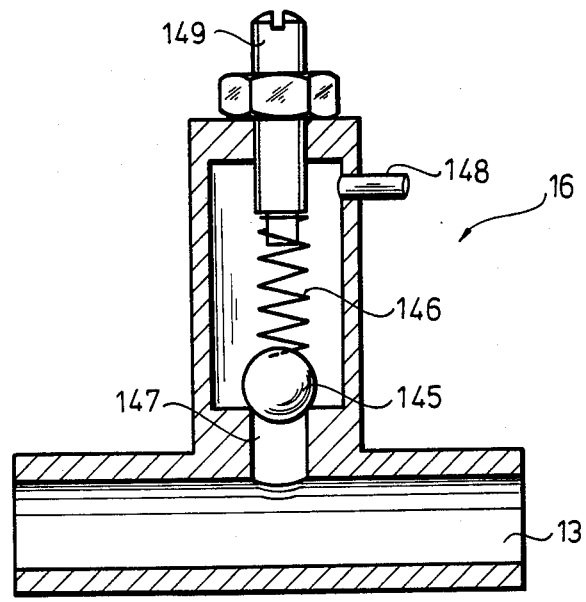
FIG. 10 is a further detail: the safety valve in cross-section and in greater scale.

In FIG. 10, safety valve 16 built into air conduit 13 is shown in cross-section (FIG. 1). If the pressure within air conduit 13 is too great, the force exerted on a ball 145 biased by a spring 146 will move the ball 145 away from an opening 147 and the pressure with escape through a blow-off opening 148. The pre-stress of spring 146 can be changed by an adjusting screw 149.

Figure 11:
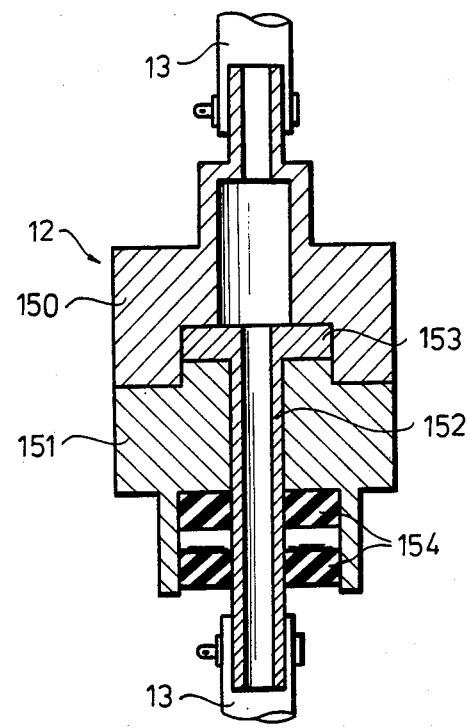
FIG. 11 is still another detail in greater scale and in cross-section.

In FIG. 11, device 12 for the air-tight connection between a rotating pipe and a stationary pipe as used in air.conduit 13 (FIG. 1) is shown in cross-section. It has two halves 150 and 151 fixed together in an air-tight manner. Between the halves 150 and 151, a hollow shaft 152 with a flange 153 is arranged which can be freely moved in respect of the halves 150 and 151. The other end of shaft 152 emerges from the half 151 and is sealed against it by sealing rings 154. The rotating portion of air conduit 13 is fixed to half 150, through the hollow inside of which the air is led to the hollow shaft 152 and further to the standing portion of air conduit 13 fixed to shaft 152. The sliding out of shaft 152 from the device 12 is prevented by flange 153 which lies against half 151.

The water supply system as shown in FIGS. 1 and 7 to 11 functions as follows.

The wind energy converted by the wind motor 1 into rotational energy drives compressor 2 and the air pressurized by it is forwarded through air conduit 13 containing coupling device 12, non-return valve 15 and safety valve 16 to equalizing pressure tank 14. Non-return valve 15 prevents the backwards flow of the pressurized air towards compressor 2 and safety valve 16 limits the pressure within the system. The pressurized air flows from pressure tank 14 into change-over device 17 with the help of which water storage tank 26 will be charged with water coming from the well 21 or with pressurized air. This is important with an eye on the further delivery and use of the water supplied by this system. If there is no water in water storage tank 26, the pressurized air is forwarded by change-over device 17 from pressure tank 14 through air conduit 18 is pneumatic-mechanical control unit 19 and from there, through air conduit 22 to the producing head in well 21. The water will than be forced out of the well 21 through delivery pipe 29 into water storage tank 26. If in the producing head in well 21 there is no water, the air pressure will be decreased, the control unit 19 returns to its initial position, thus, the pressurized air will not be forwarded into well 21 which, after this, can once again be filled with water in its natural way. In the meantime, the pressurized air will be collected in pressure tank 14 and, after reaching a given value of air pressure, the control unit 19 switches over for bailing water from the well 21 once again.

This procedure will continue until float 36 in float chamber 33 attached to water storage tank 26 closes the tapered opening 38 of float chamber 33 with its tapered upper portion 37 as a result of the high water level in tank 26. The water and the pressurized air will be filled in as previously but the air can not escape through opening 38 closed by float 36 in an air-tight manner. Thus, the pressure within the tank 26 will increase and the change-over device 17 will be activated. Thereafter, the air will not be led to control unit 19 but only to water storage tank 26 through air conduit 24. The pressure will now be increased within the tank 26 until the pre-determined pressure value is reached, at which the safety valve 16 in air conduit 13 opens and the air compressed by compressor 2 escapes into the atmosphere.

Now, if water is taken away from water storage tank 26 through water pipe 31 and cock 32, the pressure within the system will be less, safety valve 16 will close by returning ball 145 into its seat in channel 147 and the pressurized air will flow once again into equalizing pressure tank 14. Therefore, the water in tank 26 will always be under pressure pre-determined by the opening pressure of safety valve 16. This pressure holds float 36 pressed against tapered opening 38 even if the water level in tank 26 is lower than the bottom of float 36. But if the water runs out of tank 26 or the pressure falls under the given value, change-over device 17 switches over, the pressurized air will once again be forwarded through air conduit 18 into control unit 19 and water will be filled into tank 26. The weight of float 36 and the measurements of tapered opening 38 are determined for leaving tapered upper portion 37 spaced from opening 38 even if there is a small overpressure within the tank 26, and, thus, the pressure exceeding that of the atmosphere can escape from tank 26 and will not hinder the filling up of tank 26 by the water.

As is clear from FIG. 7, the pressurized air flows from change-over device 17 into air tank 81 of the pneumatic-mechanical control unit 19. The pressure increases until the force of spring 87 of operating valve 82 is over come. This force can be varied by adjusting screw 92 according to the depth of the well 21. For example, if the well 21 has a depth of 20 meters, the pressure within air tank 81 can be adjusted to 2.5 bars. After reaching this value, the pressurized air will move membrane 86 away 86 from conduit 84 leaving from its opening and the air will flow into lower space 89 of operating valve 82 and, through air conduit 94, into lower space 93 of working valve 83. Membrane 95 will be moved against the force of spring 97 together with valve shaft 98. In the course of this, through bore 102 comes into alignement with air conduit 85 and the air will flow from air tank 81 to hole 103 of channel 100 and further through air conduit 22 into the producing head in well 21. If there is water in the well 21, chamber 140 will be at least partly filled with water. Since the pressurized air coming through conduit 22 has a greater pressure than the pressure in the inside of delivery pipe 29, valve 141 will be opened and the water will be forced by the air pressure into delivery pipe 29 and, finally, into water storage tank 26. After this, the spring 87 of operating valve 82 will once again be able to press membrane 86 onto pipe 84 and spring 97 of working valve 83 will be able to press membrane 95 towards lower space 93. Thus, through bore 102 leaves air conduit 85 and comes into alignment with air conduit 22 and blow-off outlet 20. In this way, the water filtering into well 21 and, thus, into chamber 140 can expel the air through air conduit 22, through bore 102 and blow-off outlet 20 into the atmosphere.

The operation of working valve 83 will be enhanced by delay valve 104 the inside of which is connected through air conduit 108 to the lower space 93 of working valve 83. When working valve 83 is in operation and valve shaft 98 moves upwards, valve cup 106 closes pipe 105, thus, there will be no air loss in the upper end position of valve shaft 98 when air is fed into the producing head of well 21. If the pressure in lower space 93 of working valve 83 is small enough to start the downwards motion of membrane 95 and valve shaft 98, the air from lower space 93 will be forwarded through air conduit 108 into delay valve 104. The cross section of pipe 105 can be adjusted by screw 109, and the valve cup 106 can leave pipe 105 only under the retardation effect of spring 107. Thus, the air leaves the working valve 83 only after a predetermined and variable retardation. Without this measurement, there would be a great loss in pressurized air which would be quite disadvantageous. Since operating valve 82 is closed before membrane 95 of working valve 83 reaches its lower end position, the operation of working valve 83 is determined only by delay valve 104.

In the change-over device 17 (FIG. 8), the pressurized air flows from compressor 2 through air conduit 13 into equalizing pressure tank 14, the volume of which is preferably twice that of the chamber 140 of the producing head. The pressure in tank 14 starts to increase after closing the tapered opening 38 of float chamber 33. After reaching the predetermined pressure value, e.g. 0.5 bar in water storage tank 26 which pressure is led through air conduit 25 to working valve 114, membrane 117 will be moved against spring 120 of working valve 114. By the way, this predetermined pressure value can be adjusted by the force of this spring 120. Flange portion 121 of push rod 118 moved by membrane 117 rotates turning lever 123 which pulls arm 126 rotating snap disk 129 by the cooperation of recess 120 and pin 128. Roller 132 moves on cam 131 on the periphery of snap disk 129, and lever 135 pulls arm 71. The cooperating slot 137 and nose 138 turn the valve body of cock 110 into its other position wherein the whole amount of pressurized air is forwarded from tank 14 through air conduit 111 and channels 112 and 113 and further through air conduit 24 into water storage tank 26, the inner air pressure of which can be observed by pressure gauge 28 (FIG. 1). The changing over of cock 110 has to be carried out in a quick manner. This can be solved by using snap spring 133. In the course of moving roller 132 upwards on cam 131, nose 138 slides within slot 137. When roller 132 is at the top of cam 131, snap spring 133 is tensioned to its maximal length and nose 138 just reaches the end of slot 137. By further rotating snap disk 129, roller 132 will move downwards on the other side of cam 131 with a relatively high speed because of the force of spring 133. This results in a quick motion at the end of push arm 136, and the cock 110 will be changed over with a quick rotation.

When the pressure in water storage tank 26 gets small enough, membrane 117 of working valve 114 returns to its initial position, in this course of which the operation of change-over device 17 will be repeated in an inverted sequence. After reaching the initial position, the water bailing from well 21 is once again possible.

Although the invention has been described with reference to specific example embodiments, it will be appreciated, that it is intended to cover all modifications and equivalents within the scope of the appended claims. Thus, first of all, the various units such as the wind motor, the water supply arrangement, the changeover automaton, the pneumatic-mechanical control unit and the well can be utilized independently or in combinations other than those given in the foregoing description.

I claim:

1. In apparatus for supplying water from a source of water, a producing head arranged within the source of water and operated by compressed air, and a compressor driven by a wind motor for compressing air for the producing head; the improvement comprising means for the temporary storage of water from said source of water, and means responsive to the level of water in said temporary storage means selectively to supply said compressed air to said producing head so as to maintain a predetermined water level in said temporary storage means, and a pressure tank to which said compressed air is supplied, a changeover device responsive to low water level in said temporary storage means to direct air from said pressure tank to a control unit and thence to said producing head, means responsive to the absence of water from said producing head to actuate said control unit to shut off the flow of pressurized air to said producing head and to store air under pressure in said pressure tank, in which, after the air in said pressure tank has regained a predetermined pressure, said control unit again supplies air to said producing head, and a float valve in said temporary storage means which closes said temporary storage means in an airtight manner after the water in said temporary storage means has regained said predetermined level, said changeover device being actuated by an increase in pressure in said temporary storage means to shut off the supply of air to said control unit and to supply air only to said temporary storage means.

2. Apparatus as claimed in claim 1, and a safety valve limiting the pressure of the air in said temporary storage means.

3. In apparatus for supplying water from a source of water, a producing head arranged within the source of water and operated by compressed air, and a compressor driven by a wind motor for compressing air for the producing head; the improvement comprising means for the temporary storage of water from said source of water, and means responsive to the level of water in said temporary storage means selectively to supply said compressed air to said producing head so as to maintain a predetermined water level in said temporary storage means, a pressure tank to which said compressed air is supplied, a changeover device responsive to low water level in said temporary storage means to direct air from said pressure tank to a control unit and thence to said producing head, in which said control unit (19) has an air tank (18) connectible to the pressure tank (14) through the action of said changeover device, a working valve (83) for connecting the producing head to the air tank (81) or to the atmosphere, and an operating valve (82) between the air tank (81) and the working valve (83) for operating the working valve (83) depending on the pressure in the air tank (81), and a membrane (95, 86) in each of the working valve (83) and the operating valve (82) separating inner spaces of said valves into two compartments (88, 89; 96, 93), in the first compartments (96, 88) of both valves (83, 82) the membranes (95, 86) are each urged by a resilient means and the second compartment (89) of the operating valve (82) is connected through an air conduit (84) to the air tank (81), the air conduit (84) is opened or closed by the membrane (86), and the second compartment (89) of the operating valve (82) is connected to the second compartment (93) of the working valve (83), and the working valve (83) has a valve shaft (98) moving with the membrane (95) within a channel (100) of the valve housing, and the valve shaft (98) has a through bore (102) for establishing connection between the air tank (81) and the producing head or between the producing head and the atmosphere, respectively.

4. Apparatus as claimed in claim 3, the channel (100) having an enlarged hole (103) to which an air conduit (22) connecting the working valve (83) to the producing head is attached.

5. Apparatus as claimed in claim 3, and means for adjusting the pre-stress of the resilient means of the membrane (86) of the operating valve (82).

6. Apparatus as claimed in claim 3, and a delay valve (104) an inner space of which is connected to the second compartment (93) of the working valve (83) and is opened or closed by a valve cup (106) made of elastic material and attached to a valve shaft (98) of the working valve (83) by resilient means.

7. In apparatus for supplying water from a source of water, a producing head arranged within the source of water and operated by compressed air, and a compressor driven by a wind motor for compressing air for the producing head; the improvement comprising means for the temporary storage of water from said source of water, means responsive to the level of water in said temporary storage means selectively to supply said compressed air to said producing head so as to maintain a predetermined water level in said temporary storage means, a pressure tank to which said compressed air is supplied, and a changeover device responsive to low water level in said temporary storage means to direct air from said pressure tank to a control unit and thence to said producing head, the changeover device (17) having a two-way changeover cock (110) connected to the pressure tank (14) by an air conduit (111), the cock (110) connecting the pressure tank (14) to the control unit

(19) in one position and to the water storage tank (26) in another position, and the changeover cock (110) being operated by pressurized air in dependency of the air pressure within the storage means (26), the changeover cock (110) being operated by the change-over device (17) through a lever mechanism connected at one end to a valve (114) cooperating with a resilient thrust means thrusting a membrane (117) of the valve (114), and to the other side of the membrane (117) the pressure of the upper air space of the water storage tank (26) communicates, the force of the resilient thrust means being transmitted to the membrane (117) by a push rod (118) having a perpendicular flange portion (121) with which a turning lever (123) of the lever mechanism is cooperating, to the turning lever (123) an arm (126) pivotally joined which cooperates with a snap disk (129) moving a lever (135) having a push arm (136) pin-joined to it and the push arm (136) is connected to the changeover cock (110) for operating it between two positions.

8. Apparatus as claimed in claim 7, and a longitudinal slot (137) cooperating with a nose (138) fixed to the changeover cock (110) and formed in the push arm (136).

9. Apparatus as claimed in claim 7, the snap disk (129) being a cam disk, on the periphery of which a cam (131) is provided cooperating with a roller (132) turnable in a holding arm (134) and forced against the periphery of the cam disk by a spring (133).

10. Apparatus as claimed in claim 7, wherein the turning lever (123) is rotatable around a pin (124) and its end (122) attached to a flange portion (121) of the push rod (118) is bifurcated.

* * * * *